US012138642B2

(12) United States Patent
Lee et al.

(10) Patent No.: US 12,138,642 B2
(45) Date of Patent: Nov. 12, 2024

(54) PUMP HEAD AND METERING DEVICE

(71) Applicant: F. Holzer GmbH, St. Ingbert (DE)

(72) Inventors: Hyeck-Hee Lee, St. Ingbert (DE); Frank Holzer, St. Ingbert (DE); Ute Steinfeld, St. Ingbert (DE); Markus Mahler, Völklingen (DE)

(73) Assignee: F. Holzer GmbH, St. Ingbert (DE)

( * ) Notice: Subject to any disclaimer, the term of this patent is extended or adjusted under 35 U.S.C. 154(b) by 367 days.

(21) Appl. No.: 17/250,880

(22) PCT Filed: Sep. 20, 2019

(86) PCT No.: PCT/EP2019/075311

§ 371 (c)(1),
(2) Date: Mar. 18, 2021

(87) PCT Pub. No.: WO2020/058469

PCT Pub. Date: Mar. 26, 2020

(65) Prior Publication Data

US 2021/0346900 A1 Nov. 11, 2021

(30) Foreign Application Priority Data

Sep. 20, 2018 (DE) ..................... 10 2018 216 060.0

(51) Int. Cl.
*B05B 11/00* (2023.01)
*B05B 11/10* (2023.01)

(52) U.S. Cl.
CPC ...... *B05B 11/0067* (2013.01); *B05B 11/1016* (2023.01)

(58) Field of Classification Search
CPC ........................ B05B 11/0067; B05B 11/1016
See application file for complete search history.

(56) References Cited

U.S. PATENT DOCUMENTS 6,062,433 A * 5/2000 Fuchs ............... B05B 11/00444 222/321.6
2004/0144805 A1* 7/2004 Maner .................. B05B 11/105 222/321.6
2004/0256414 A1* 12/2004 Graf .................... B05B 11/1016 222/321.9

(Continued)

FOREIGN PATENT DOCUMENTS

| | | | |
|---|---|---|---|
| DE | 202012012770.5 | U1 | 11/2013 |
| DE | 102016212892.2 | B3 | 12/2017 |
| WO | WO-2017029467 | A1 | 2/2017 |

OTHER PUBLICATIONS

"International Application Serial No. PCT/EP2019/075311, International Search Report mailed Jan. 7, 2020", w/ English Translation, (Jan. 7, 2020), 7 pgs.

(Continued)

*Primary Examiner* — Jeremy Carroll
(74) *Attorney, Agent, or Firm* — Schwegman Lundberg & Woessner, P.A.

(57) ABSTRACT

The invention relates to a pump head (I) with a specially designed flexible valve (20) which securely connects the pump head. The valve ensures the pump head is securely closed. The invention also relates to a metering device which can be designed, for example as a squeeze bottle, as a non-airless system or as an airless-system. Said metering device comprises the claimed pump head.

45 Claims, 12 Drawing Sheets

(56) References Cited

U.S. PATENT DOCUMENTS

Figure 1:
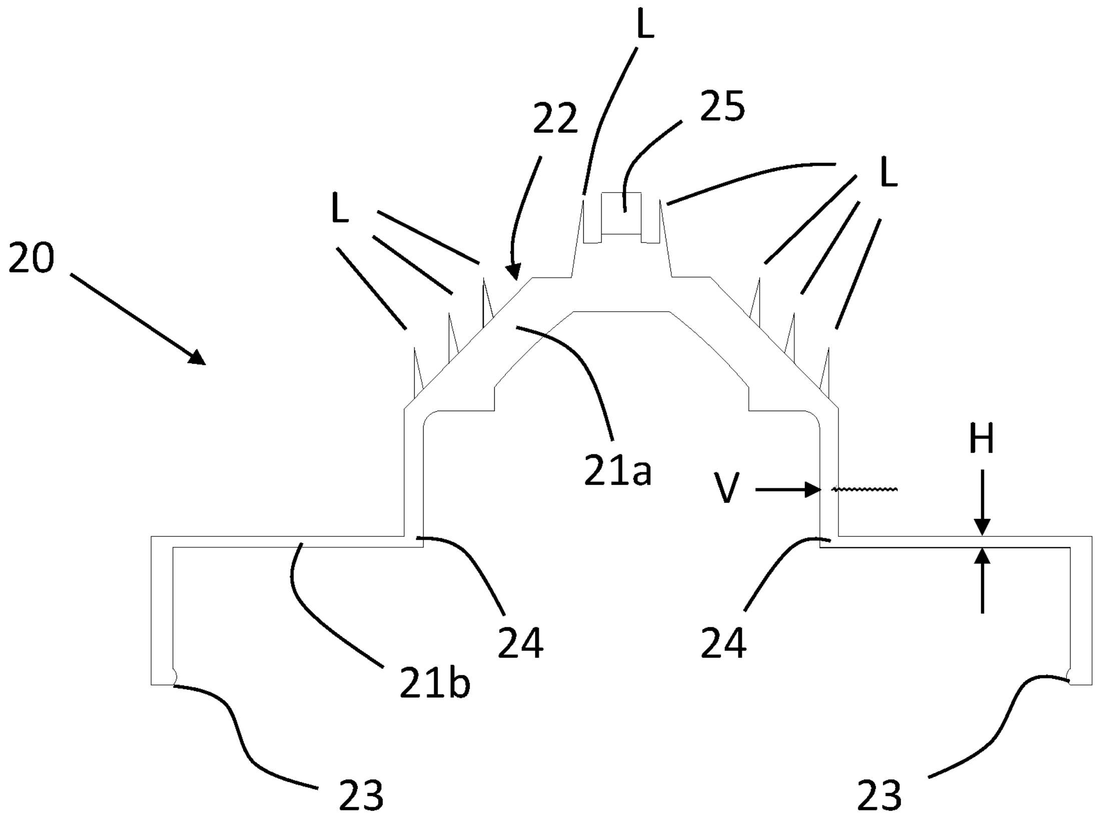

| | | | | |
|---|---|---|---|---|
| 2005/0098583 | A1* | 5/2005 | Mbonyumuhire .. | B05B 11/1063 222/321.7 |
| 2005/0127107 | A1* | 6/2005 | Mbonyumuhire .... | B05B 11/107 222/383.1 |
| 2007/0210114 | A1* | 9/2007 | Stadelhofer ......... | B05B 11/0067 222/335 |
| 2009/0026289 | A1* | 1/2009 | Nadler ................ | B05B 11/0044 239/333 |
| 2010/0252581 | A1* | 10/2010 | Greiner-Perth ....... | B05B 11/107 222/320 |
| 2015/0274386 | A1* | 10/2015 | Ritsche .............. | B65D 47/2068 222/335 |
| 2017/0291183 | A1* | 10/2017 | Lee ..................... | B05B 11/1001 |
| 2018/0229247 | A1* | 8/2018 | Laidler ................. | B05B 1/3405 |
| 2020/0055644 | A1* | 2/2020 | Höhm ................ | B65D 47/2056 |
| 2022/0192872 | A1* | 6/2022 | Greiner-Perth ..... | B05B 11/1064 |

OTHER PUBLICATIONS

"International Application Serial No. PCT/EP2019/075311, Written Opinion mailed Jan. 7, 2020", (Jan. 7, 2020), 12 pgs.

* cited by examiner

PUMP HEAD AND METERING DEVICE

PRIORITY APPLICATIONS

This application is a U.S. National Stage Filing under 35 U.S.C. § 371 from International Application No. PCT/EP2019/075311, filed on Sep. 20, 2019, and published as WO2020/058469 on Mar. 26, 2020, which claims the benefit of priority to German Application No. 10 2018 216 060.0, filed on Sep. 20, 2018; the benefit of priority of each of which is hereby claimed herein, and which applications and publication are hereby incorporated herein by reference in their entireties.

The present invention relates to a pump head having a specially designed elastic valve that enables a secure closure of the pump head. A secure closing of the pump head is ensured by the valve. The present invention also relates to a metering device that can, for example, be configured as a squeeze bottle, as a non-airless system, or as an airless system, wherein the metering device comprises a pump head in accordance with the invention.

Metering systems such as squeeze bottles, non-airless systems or airless systems are known from the prior art. These systems are characterized by a portioned metering of fluids to be dispensed or by a continuous dispensing of fluid on application of a corresponding pressure on the metering device.

It is the object of the present invention to provide a pump head that does not have the previously named disadvantages. The pump head should close in a reliably sealing manner; an easy opening, also after a longer standing of the pump head, and a reliable sealing of the storage vessel with respect to the storage vessel or the pump head toward the external environment should be ensured. The pump head should furthermore have a sufficiently simple mechanical operability so that strong springs and large operating forces accompanying them can very largely be dispensed with. The pump head in accordance with the invention should additionally have a lower tendency to seizing.

This object is achieved with respect to a pump head by the features of claim 1 and with respect to a metering device by the features of claim 40. The respective dependent claims in this respect set forth advantageous further developments.

The present invention thus relates to a pump head for a metering device for the metered dispensing of a fluid comprising

- a head part ("head base") having a discharge opening for the fluid to be dispensed, with the head base having an inner surface;
- an elastic valve that has a surface facing the inner surface of the head base, wherein at least one sealing lip formed peripherally around the discharge openings is formed on the surface;
- a first component ("liner") that has a passage opening for the fluid to be dispensed via which a flowing in of the fluid between the head base and the elastic valve is made possible while deforming the elastic valve and/or the at least one sealing lip and while forming an intermediate space between the at least one sealing lip and the head base (actuation state),
- wherein the head base and a first component are connected in a positively-locking and force-fitting manner while enclosing the elastic valve between the head base and the first component.

In the storage state, the at least one sealing lip of the elastic valve is pressed circumferentially around the discharge opening onto the inner surface of the head base and so seals the intermediate space toward the environment.

The pump head in accordance with the present invention thus comprises an elastic valve that is enclosed between a head base and a (first) component and that has at least one, preferably a plurality of sealing lips at its surface facing the head base. The sealing lips here project out of the surface of the elastic valve facing the head base. The discharge opening of the head base can be fluidically sealingly surrounded and thus closed by pressing the valve toward the head base. The seal arranged between the head base and the first component thus enables a seal between the head base and the component.

The intermediate space is formed here in that the at least one sealing lip contacting the inner surface of the head base in the storage state is e.g. displaced by discharging fluid and the fluid thus forms a gap or an intermediate space between the elastic valve and the inner surface. The fluid can then flow through the forming gap between the valve and the inner surface in the direction of the outlet opening.

It is here particularly advantageous in the pump head in accordance with the present invention that it is not the total surface of the valve head that lies on the component, but only a substantially spot-like contact between the sealing lips and the head base in the storage state. A risk of sticking together of the elastic valve and the head base such as initially presented is minimized due to the limited support or contact surface between the valve and the head base. The spring force by which the valve is pressed toward the head base can also become smaller due to the spot-like contact of the valve at the head base via the lips so that a simpler operability is present.

The contact pressure of the valve on the head base is equally increased due to the reduced contact surface between the elastic valve and the head base because of the presence of sealing lips. The contact pressure at the contact point of the sealing lips is maximized in comparison with a full-area contact of a valve head on the inner surface of the head base with the same contact pressure that can, for example, take place due to a spring pressing the valve onto the head base due to the minimized contact surface of the valve at the head base. The sealing effect of the valve is hereby considerably increased.

The elastic valve thus makes possible a particularly efficient sealing of the discharge opening toward the environment. Production defects originating from the manufacture can be compensated by this seal so that an efficient sealing of the inner flow path of the liquid and/or gases to be metered is also ensured with a non-ideal geometrical design or arrangement of all the components of the pump head.

The risk that an unwanted penetration of bacteria or other contaminants from the external environment can take place is equally minimized due to the better sealing.

The safety of the pump head in accordance with the invention is thus considerably increased.

The pump head in accordance with the present invention thus ensures a complete function of the pump head with a simultaneously improved sealing function even after a longer standing—and a drying up that might take place of the fluid to be dispensed, that could still be present in the intermediate space between the valve and the head base.

In accordance with the present invention, the head base and the elastic valve with sealing lips are thus matched to one another. Due to the fact that the elastic valve is at least regionally formed as elastic, the valve can deform during the metering procedure and can release a gap or intermediate space via which the fluid can flow in the direction of the outlet opening.

In accordance with this preferred embodiment, the wall of the elastic valve is in particular elastic, whereas the head can be rigid or equally flexible and is thus directly adapted to the configuration of the inner surface of the head base. A secure engagement of the head of the elastic valve with the sealing lips in the inner surface of the head base is thus ensured in the region of the outlet opening.

It is in particular of advantage here for the elastic wall to have at least one predetermined kink point at which the elastic wall kinks downward or inward on a change from the storage state into the actuation state.

The elastic wall can, for example, be designed as step-shaped and can have at least one vertical and one horizontal region (or a surface), with the predetermined kink point in particular being formed at a connection point of the vertical and horizontal regions.

It is moreover advantageous if the elastic wall and/or the head is formed from an elastically deformable material, in particular from a thermoplastic, polyethylene, polypropylene, rubber, and/or silicone, preferably with a thickness of 0.01 to 2.0 mm, and/or if the head is formed as solid, with, in the case of a step-shaped configuration of the wall, the at least one horizontal region being thinner than the at least one vertical region, with the at least one vertical region in particular having a thickness of 0.1 to 2.0 mm, preferably 0.2 to 1.0 mm, and/or with the at least one horizontal region having a thickness of 0.01 to 1.0 mm, preferably 0.03 to 0.5 mm.

The head of the elastic valve can preferably be formed from the same material as the elastic wall. The head and the elastic wall are in particular formed in one piece and are in particular manufactured simultaneously by an injection molding process.

The elastic valve preferably has 1 to 5 sealing lips, preferably 2 to 4 sealing lips, with the sealing lips being formed as circumferential around one another when a plurality of sealing lips are present. The circumferential arrangement of a plurality of sealing lips with respect to one another can also be described as a concentric arrangement of the respective sealing lips.

It is advantageous in this respect if the at least one sealing lip projects out of the surface of the valve head by 0.01 to 2 mm, preferably 0.03 to 1 mm.

It is further preferred that the elastic valve has at least one first sealing lip that, in the case that the elastic valve has a plurality of sealing lips, is arranged closest of all the sealing lips to the outlet opening. This first sealing lip is thus arranged in the direct proximity of the outlet opening. The first sealing lip preferably includes an angle θ with the inner surface, with $1° \leq \theta \leq 85°$ preferably applying, further preferably $5° \leq \theta \leq 60°$, particularly preferably $10° \leq \theta \leq 45°$. This angle θ ensures that the first lip experiences a tangential pressure on a pressing of the valve onto the head base and may deform in this process and nestle against the wall of the head base. The support surface of the lip on the wall is here increased so that the sealing effect is amplified. The contact force of the valve on the wall of the head base can thereby equally be reduced without this being at the cost of the sealing effect. The operating friendliness of the pump head is thus equally improved.

In the case that a plurality of sealing lips are present, the further sealing lips can also be formed in accordance with the aforesaid embodiment.

The geometrical design of the sealing lips in projection onto the discharge opening is not restricted by this. It is, however, advantageous if the circumference of the at least one sealing lip around the discharge opening is circular.

The elastic valve is preferably fluidically sealingly connected to the component.

In a further advantageous embodiment, the elastic valve has at least one fixing element via which the elastic valve is connected in a force-fitting manner to at least one corresponding fixing element of the first component, with the fixing element of the elastic valve and the fixing element of the first component preferably being configured as a latch connection or a snap-in connection.

It is further preferred if the first component has a wall that terminates the intermediate space, with a fluidic communication of the intermediate space with a region disposed at the other side of the wall, viewed from the intermediate space, being made possible via the passage opening.

In accordance with this embodiment, separate regions can be formed within the pump head via which a reliable metering of the liquid is possible.

In accordance with a further preferred embodiment, provision is made that the passage opening is led directly through the wall from the region disposed on the other side of the wall and opens into the region or is led through a lateral wall of the first component in the region on the other side of the wall and is guided at an outer surface of the first component in a notch that can be bounded by the component and is again guided in the region through the lateral wall of the first component and opens into the region disposed between the valve head and the head base.

In particular the last-named possibility, according to which a notch is provided in the outer surface of the component, makes possible a preferred guidance of the fluid in the intermediate space between the head part and the elastic valve.

The notch at the outer surface of the first component is in particular guided horizontally and/or vertically.

It is furthermore advantageous that the angle the passage opening includes with a point of the one repeat leadthrough through the lateral wall of the first component and a center of the first component amounts to 10 to 350°, preferably 90 to 270°.

It is particularly preferred here that an element that exerts a return force on the elastic valve is arranged between the elastic valve and the first component, with the return force having the effect that the intermediate space formed in the actuation state is closed while returning to the storage state. The element is in particular a spring.

It is further advantageous in this respect that the first component is connected at its end remote from the elastic seal to a (second) component via which the pump head is connectable to a storage vessel for storing the fluid to be dispensed. The connection can here be direct or indirect.

It is in particular of advantage here if at least one means for the sterile filtration of incoming air is present between the first component and the second component (non-airless system), in particular a bacterial filter, or the first component is hermetically sealed toward the second component (airless system).

The at least one means for the sterile filtration of incoming air preferably has at least one passage channel for the fluid, with the at least one means being arranged in the pump head such that the passage channel opens into the passage opening of the first component.

The pump head configured for non-airless systems can here in particular be used with squeeze bottles or corresponding metering apparatus having a pump head.

A passive actuation of the pump head takes place here with squeeze bottles since the fluidic pressure takes place by actuation of the squeeze bottle connected to the pump head.

The first component can here be fixed with respect to the second component. This embodiment is in particular advantageous for metering apparatus that comprise a squeeze bottle.

In the case of metering systems in which pressure is formed by the actuation of the pump head itself, there is an active actuation of the pump head. Such pump heads can be used both for airless and non-airless metering systems.

It is preferred in such systems if the first component is formed as movable with respect to the second component, with at least one means that exerts a return force on the first component being arranged between the first component and the second component, with the component preferably being a spring.

This embodiment is in particular of advantage for pump heads to be actively operated; in this process, a pressure can be exerted on the fluid to be metered by moving the individual first and second components.

A further preferable embodiment provides that the pump housing comprises an inlet at the base side that can preferably be closable by means of a valve, in particular a disk valve or ball valve, during the actuation procedure and can be opened on a moving of the pump head from the actuation state into the storage state. Such an embodiment is in particular preferred with actively actuable airless and/or non-airless pump heads.

On moving the pump head from the actuation state into the storage state, liquid stored in a storage vessel flows into the pump housing by the opening of the valve in this process.

A riser pipe can moreover be arranged at the inlet of the pump housing at the base side. This embodiment is in particular of advantage with non-airless systems having an actively actuable pump head. In the case that it is an airless system, a riser pipe may not be necessary with actively operable pump heads.

A further preferred variant of the pump head provides that, on the connection of the pump head to the storage vessel via the second component, a seal is arranged between the second component and the storage vessel or on a connection to the storage vessel via the pump chamber, a seal is arranged between the pump chamber and the storage vessel.

The pump head in accordance with the invention is further preferably configured such that a second elastic valve that closes the passage channel of the component in a storage state and that releases it by deformation in an operating state is arranged between the first component and the second component.

Provision can be made here that the second valve in projection onto the passage channel has a base body closing the passage channel and having at least one passage opening arranged outside the passage channel in projection onto the passage channel, in particular two passage openings arranged oppositely disposed.

Provision is in particular made in this embodiment that the at least one passage opening, in particular the two passage openings arranged oppositely disposed, is/are formed as circle segment-like cutouts in the base body. On deformation of the second valve in the metering process, fluid to be dispensed can thus pass through the circle-segment like cutouts released by the deformation, while the base body closes the passage channel in the storage state.

It is further preferred that the base body has a guide element and/or a stopper, e.g. a pin, at the side facing the first component that limits the valve deformation, that cooperates with a corresponding guide element of the first component, e.g. a cutout receiving the pin, on a release of the passage channel. The valve is deformed on the output of the liquid and thus opened. The reshaping of the valve may not be as extreme as desired so that a return to the original shape is still possible after the liquid output. The guide element thus prevents the complete inversion of the valve.

The second component can in particular comprise at least one actuation means, in particular a projection.

In the case that the pump head is configured for the active dispensing of a fluid, for example by actuation, the second component is preferably indirectly connectable to a storage vessel, with the pump head additionally comprising

- a cylindrical pump head (80) that comprises a first hollow cylindrical pump body section that is open in the direction of the storage vessel and a second hollow cylindrical pump body section that is open in the direction of the second component;
- an inner hollow cylinder (90) that is open at both ends, that is fastenable or fastened to the first pump body section, and that is arranged concentrically thereto; and
- a piston that has a continuous channel, that is movably supported concentrically in the pump body and in the inner hollow cylinder, and that is configured as sealing with an inner wall of the inner hollow cylinder,
- with the second component being connectable or connected to the pump body and being movably supported with respect to the pump body and with the continuous channel opening into the passage channel.

It is in particular preferred in the previously named embodiment if the second component has a recess to receive an upper end of the piston.

An element, in particular a spring element, is preferably arranged between the component and the pump body that exerts a return force on the component during and/or after an actuation.

The first pump body section can furthermore have an apparatus for fastening the pump head to the storage vessel.

It is further preferred that a seal is arrangeable or arranged in the region of the first pump body head section and seals the storage vessel with respect to the pump head.

It is furthermore of advantage here if a riser pipe is arrangeable or arranged at the end of the inner hollow cylinder open in the direction of the storage container.

Provision can additionally be made that a sealing element for sealing the piston is arrangeable or arranged between the outer side of the piston and the inner side of the second pump body section at the interior of the second pump body section.

The head base can preferably comprise an antibacterial material, preferably metals or metal ions, and can in particular contain silver particles or silver ions. The head part is in particular manufacturable in an injection molding process, with an antibacterial material, for example, being directly compounded with the thermoplastic material that is used to manufacture the injection molded part.

The invention also relates to a metering apparatus that comprises a pump head as described above. The pump head is connected to a storage vessel here.

The storage vessel can preferably be configured as a squeeze bottle or as a rigid container.

It is equally possible that the storage vessel comprises an inner bag that is hermetically sealed with respect to the pump head, with the inner bag in particular being configured as a folding bellows.

This embodiment is in particular suitable for airless systems.

The metering device in accordance with the present invention is suitable for storing both fluids or solutions containing preservatives, but in particular for the storage of fluids or solutions free of preservatives.

The present invention will be described in more detail with reference to the enclosed Figures without restricting the invention to the specifically shown embodiments.

Figure 2A:
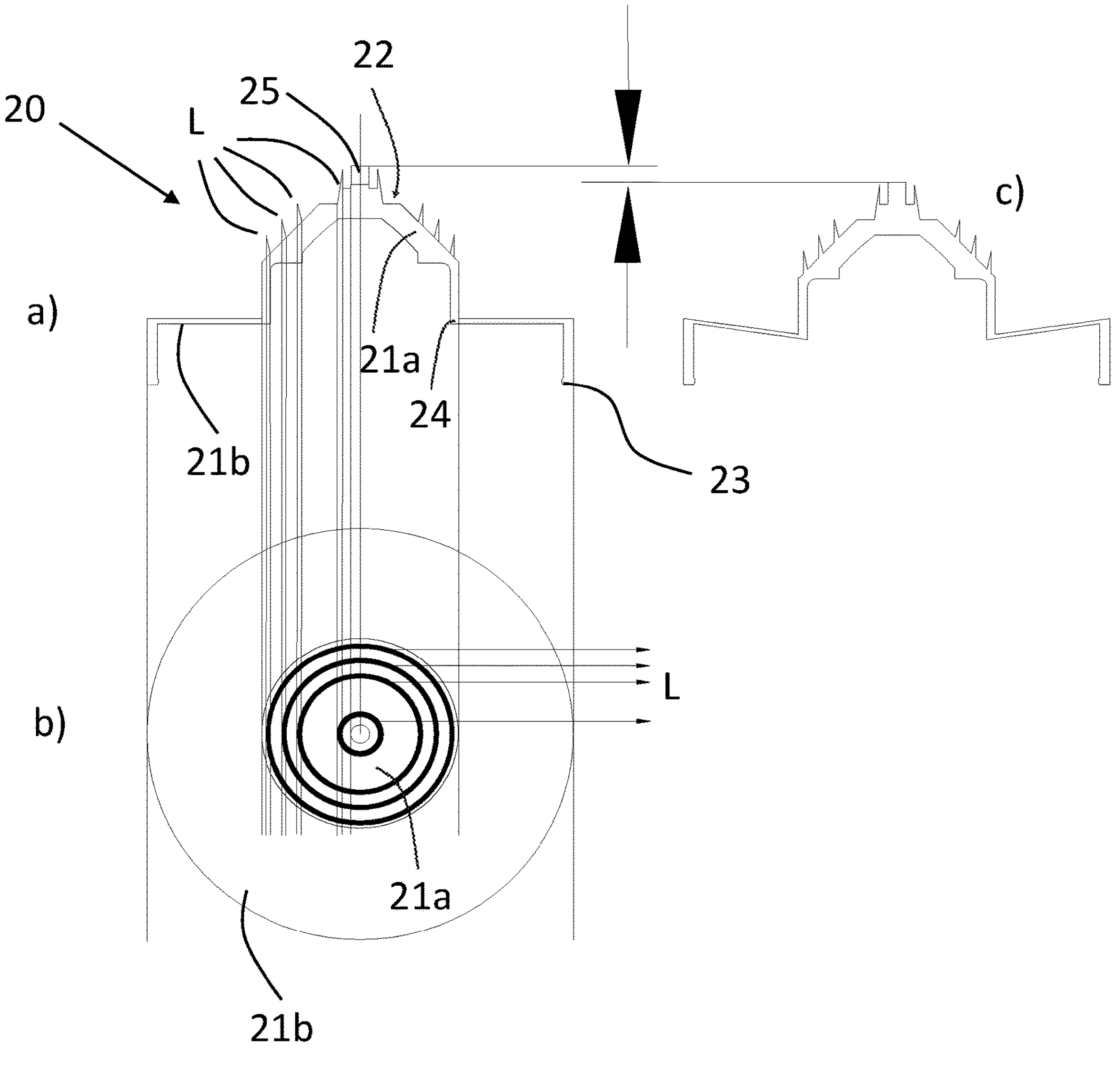
Figure 2B:
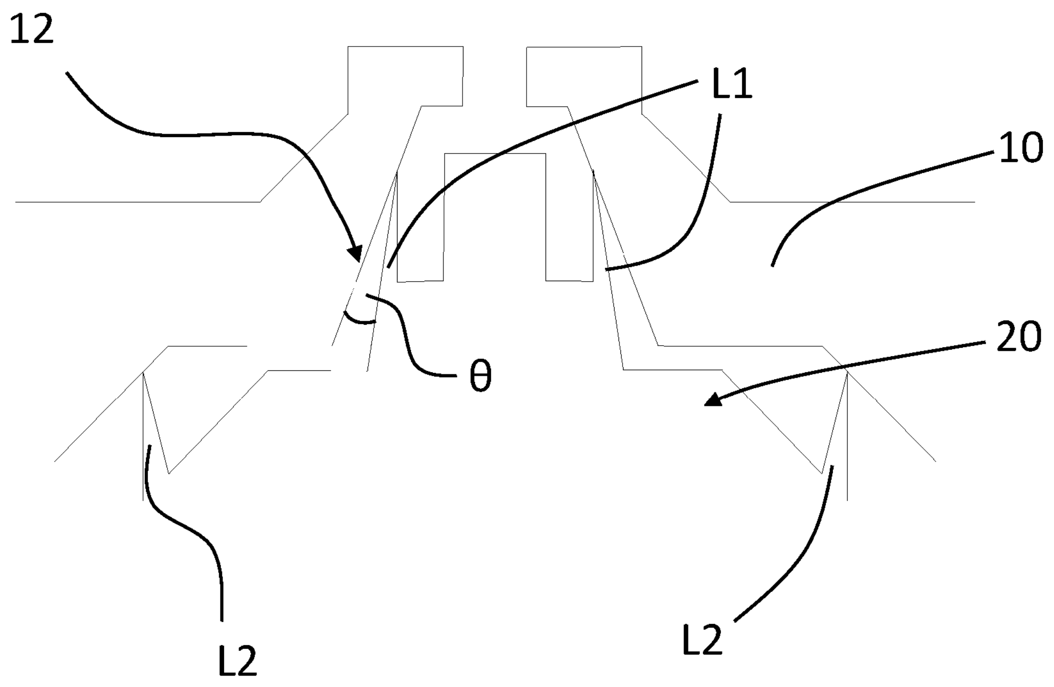
Figure 2C:
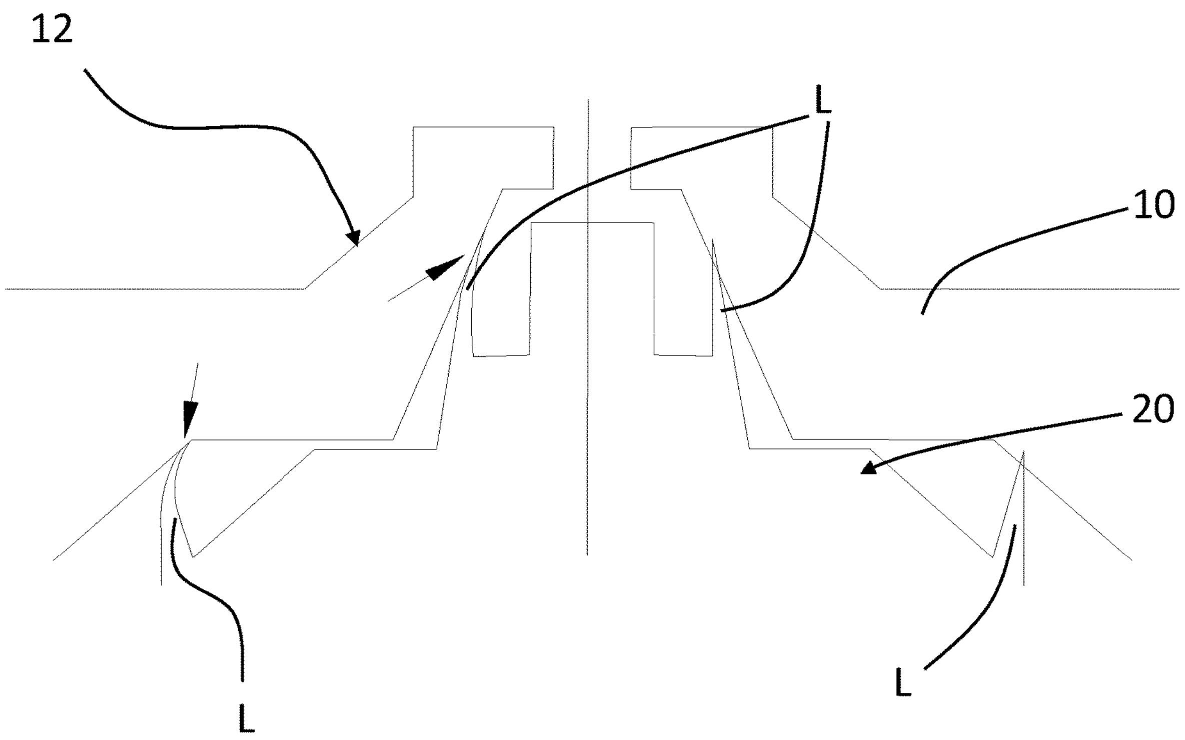
Figure 3:
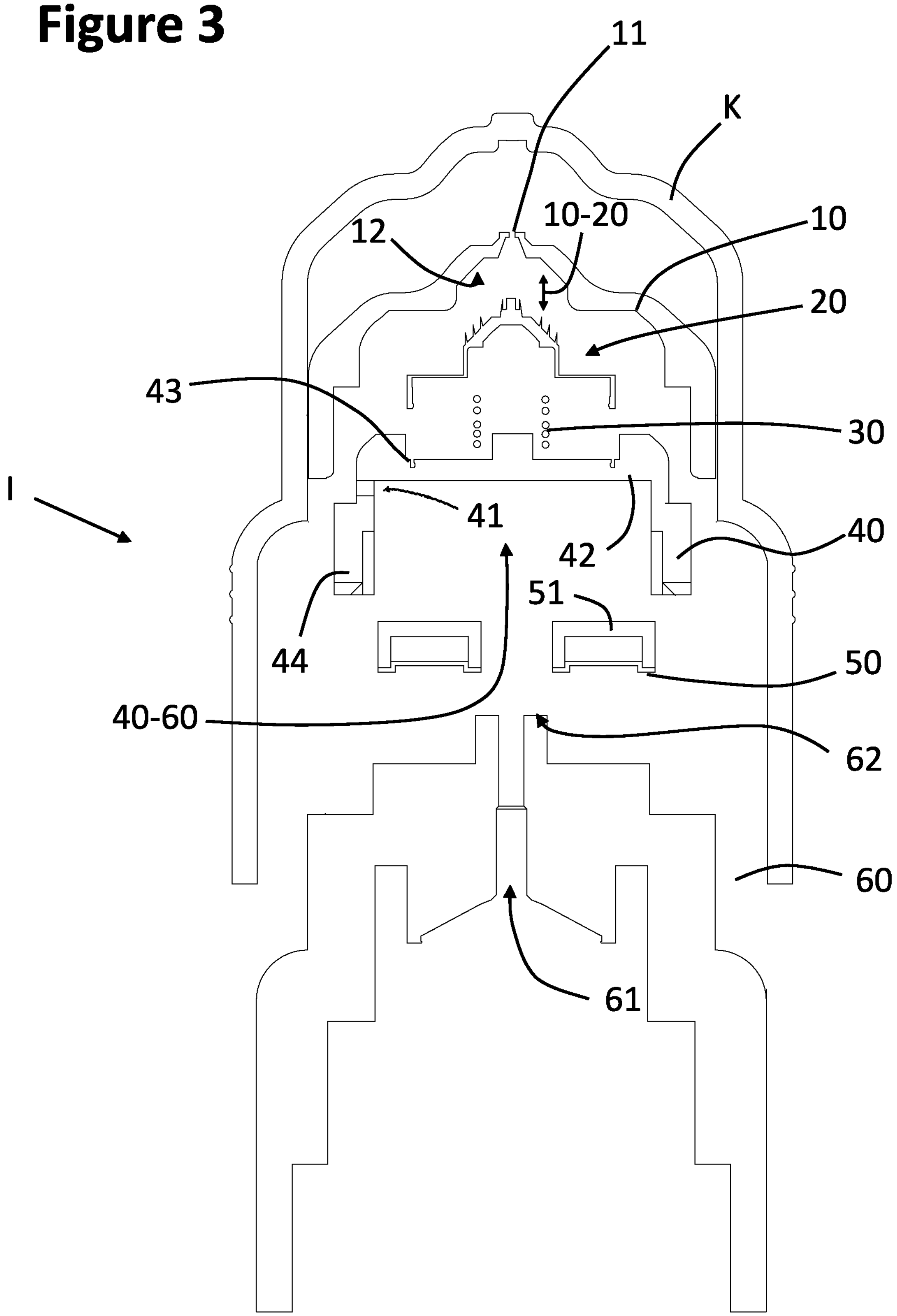
Figure 4:
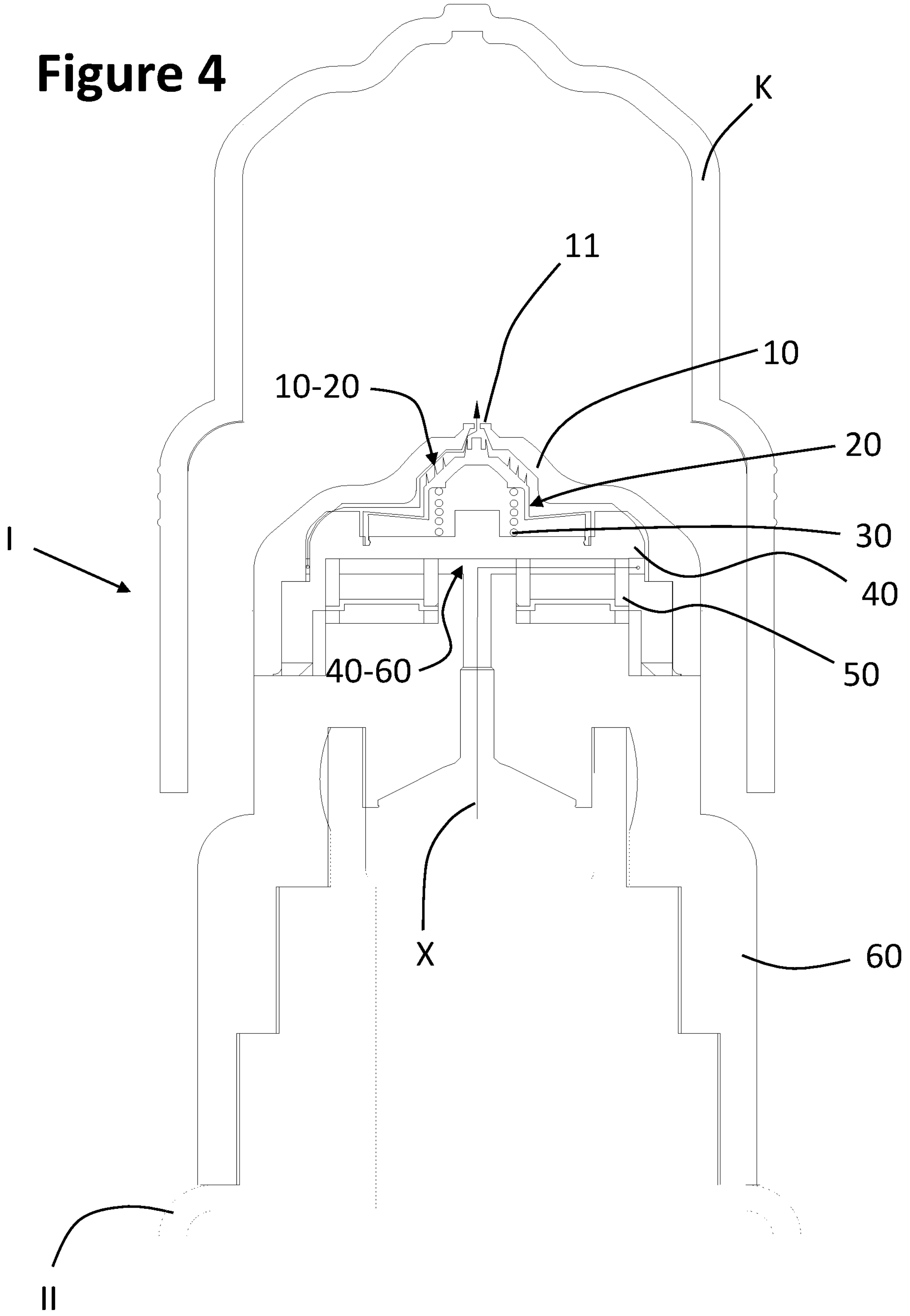
Figure 5:
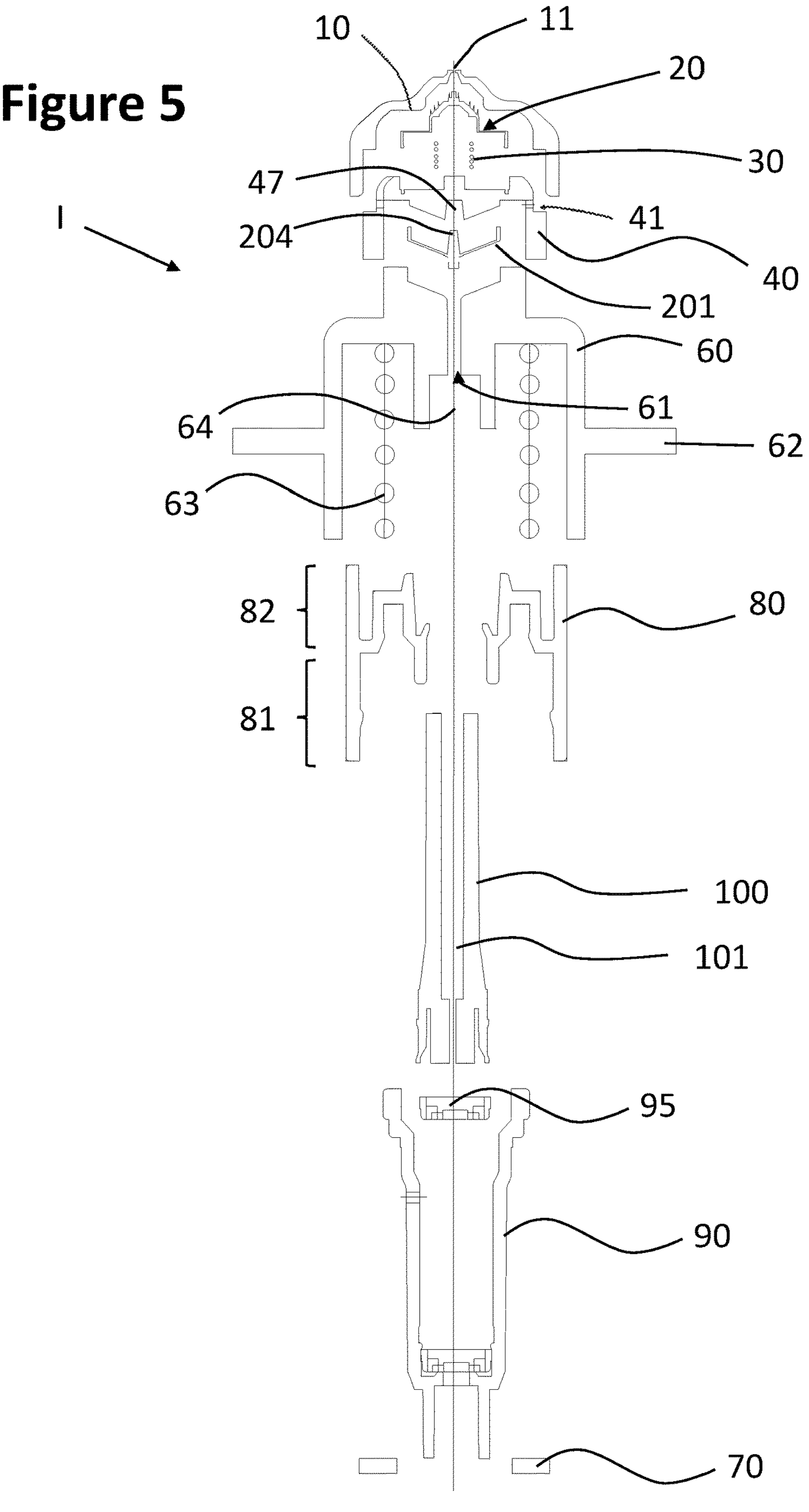
Figure 6:
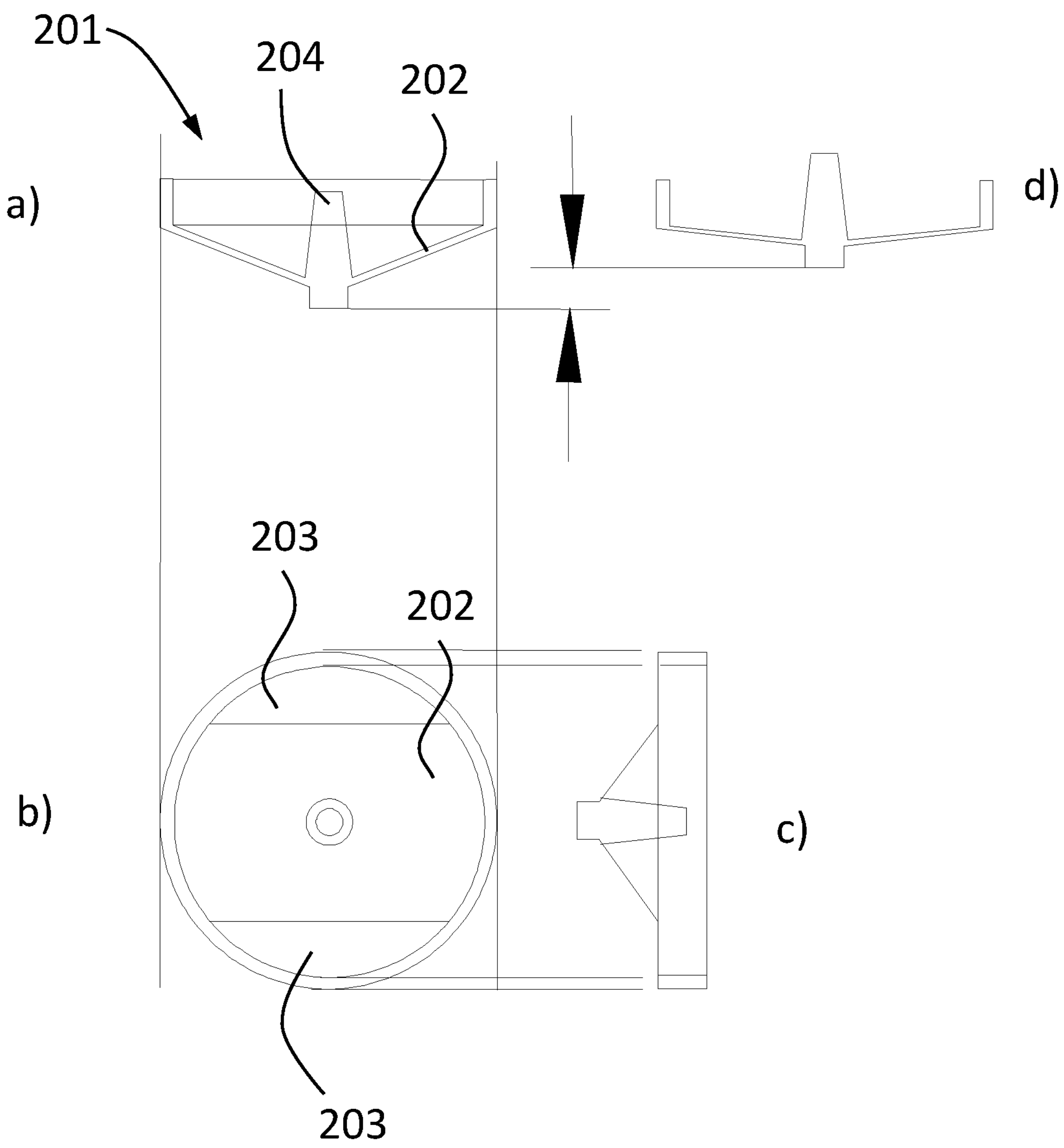
Figure 7:
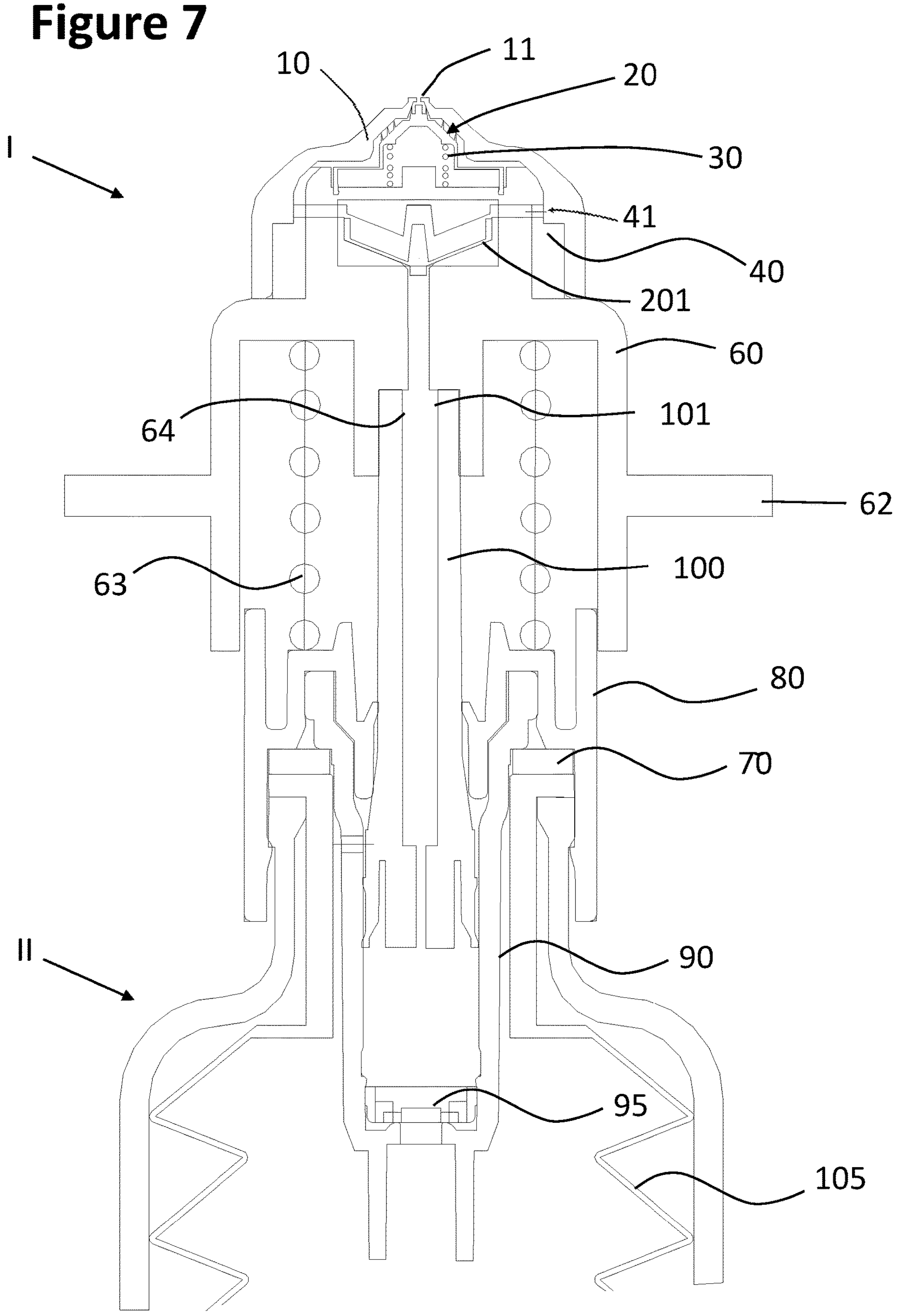
Figure 8:
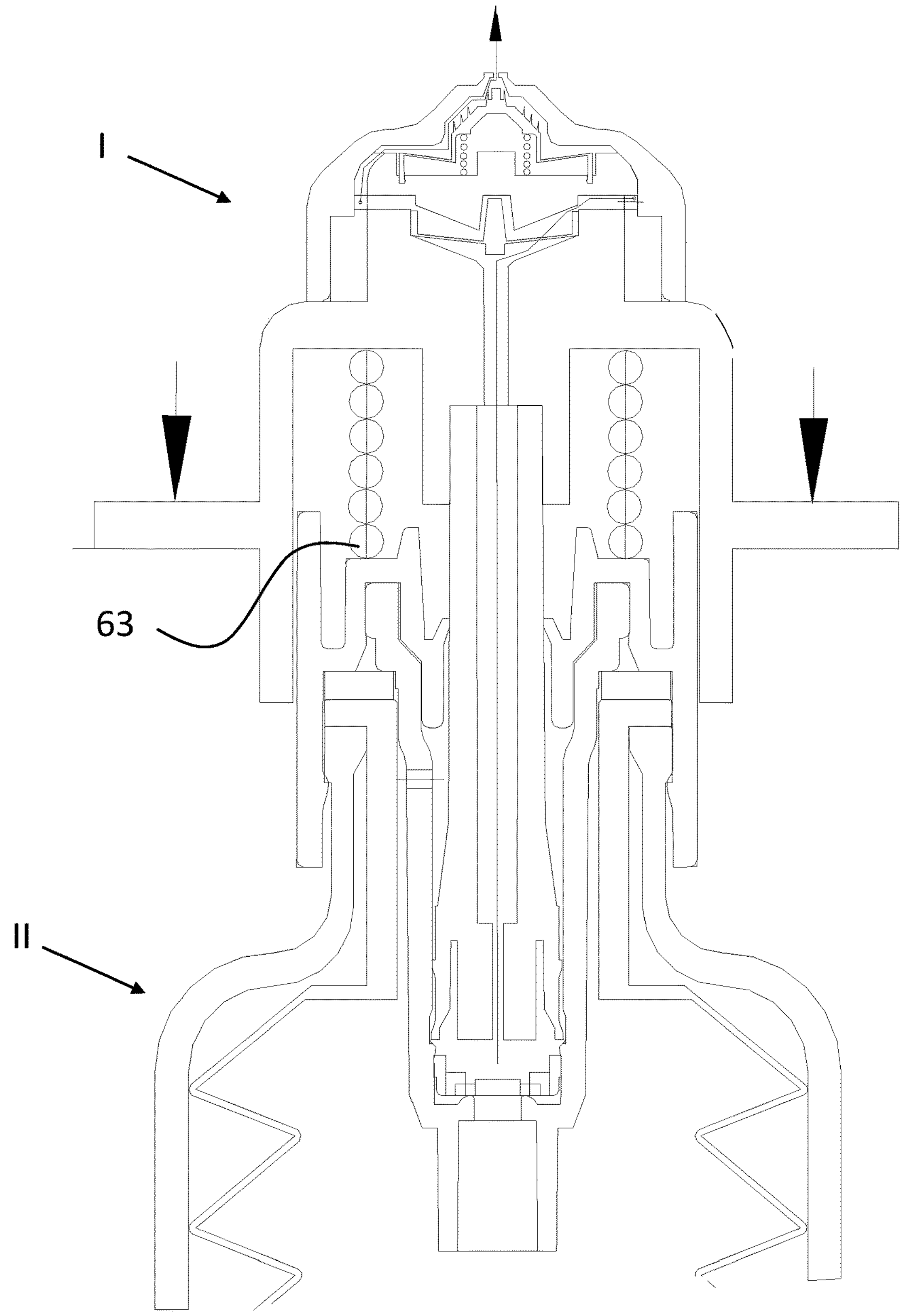
Figure 9:
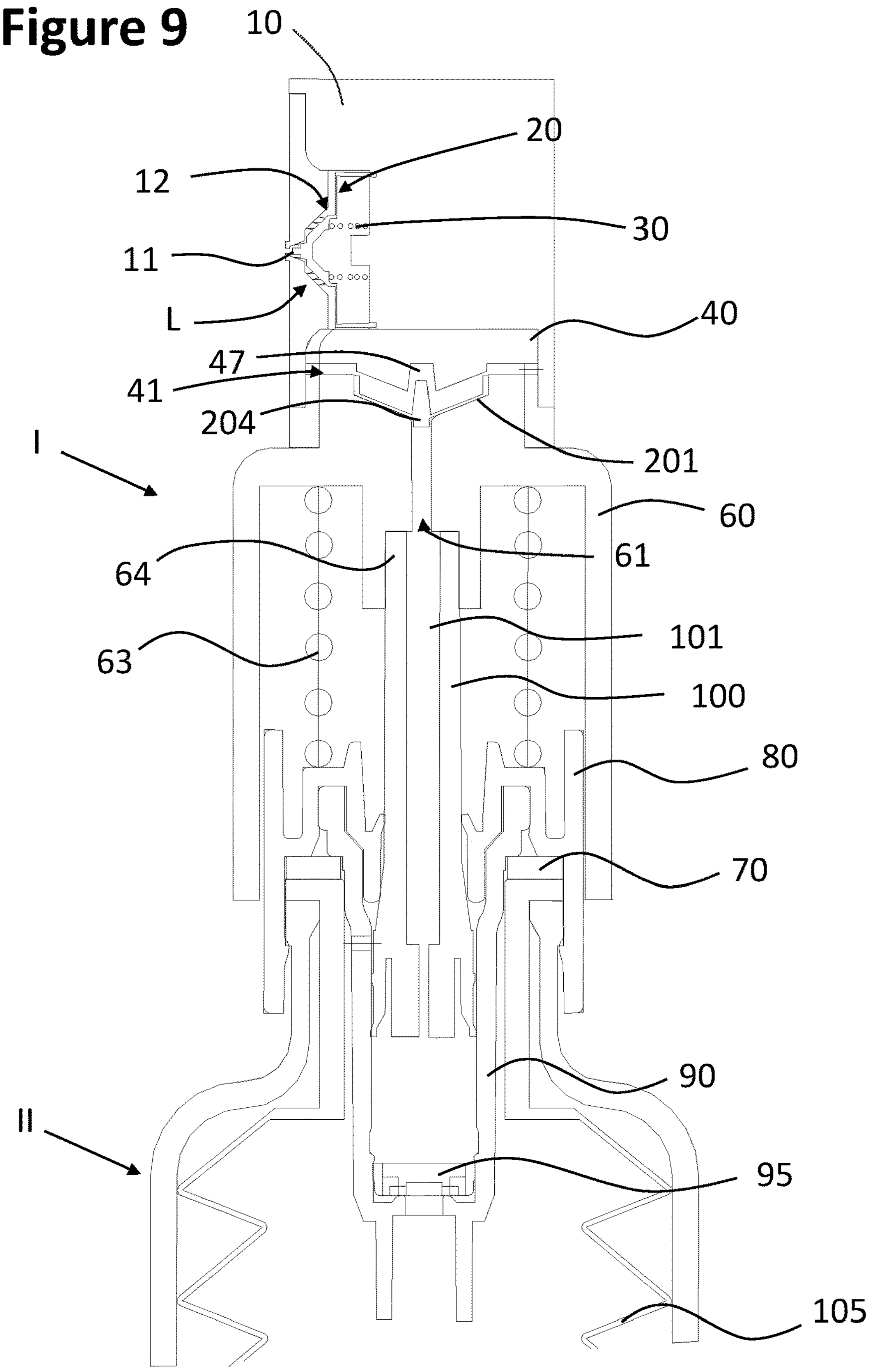
Figure 10:
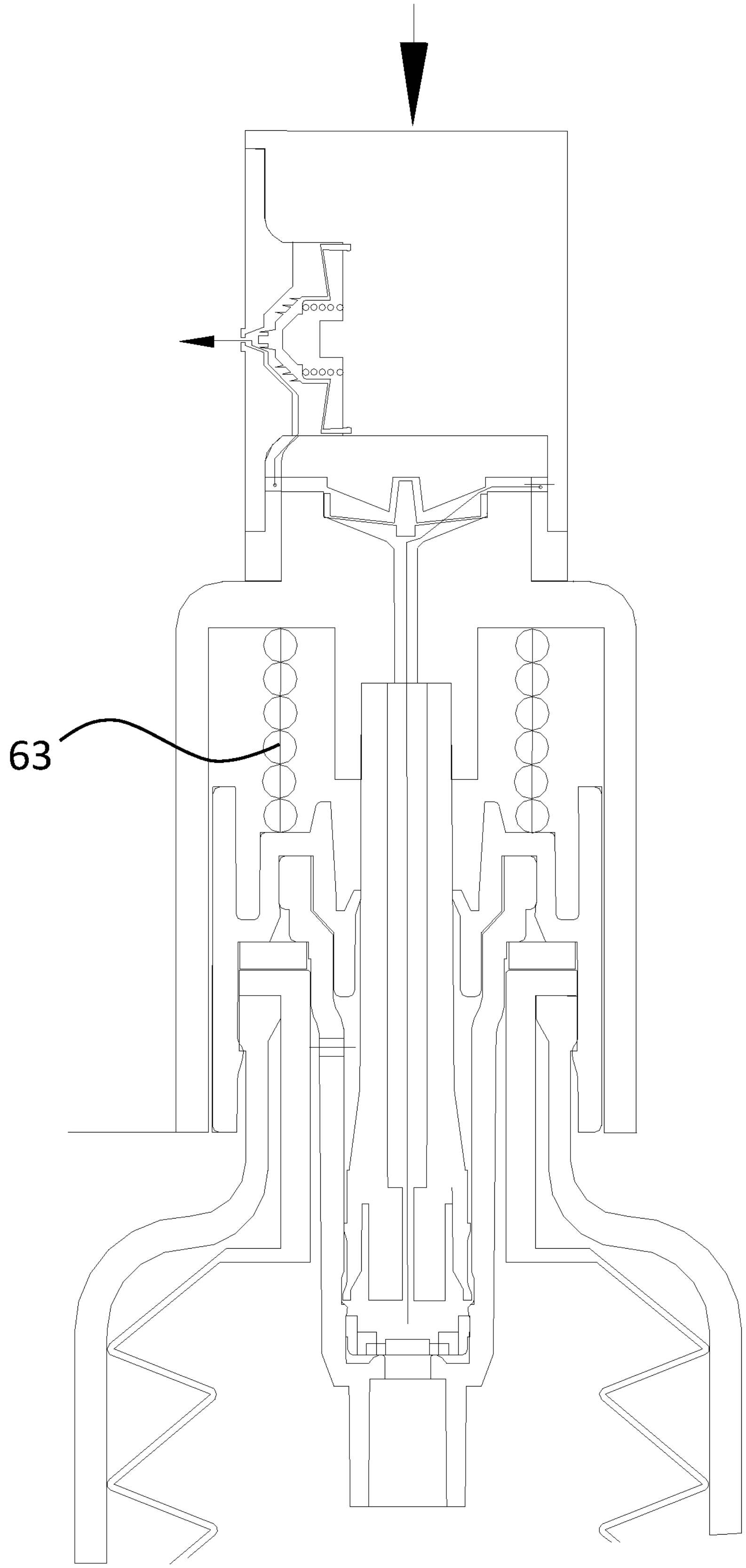

There are shown:

FIG. 1 an elastic valve in cross-section that is used in a pump head in accordance with the invention (not shown in FIG. 1);

FIGS. 2*a-c* a further embodiment of an elastic valve in different perspective representations that is used in a pump head in accordance with the invention (not shown in FIG. 2);

FIG. 3 an exploded drawing of a pump head in accordance with the invention;

FIG. 4 a pump head in accordance with the invention in accordance with FIG. 3 that is attached to a squeeze bottle;

FIG. 5 an exploded drawing of a further pump head in accordance with the invention that is configured as an active pump head;

FIG. 6 different perspective views of the elastic valve 201 in FIG. 5;

FIG. 7 the pump head in accordance with the invention shown as an explosion drawing in FIG. 5 in an assembled form;

FIG. 8 the pump head shown in FIG. 7 in the actuation state;

FIG. 9 a further embodiment of a pump head in accordance with the invention for the lateral output of the fluid; and FIG. 10 the pump head shown in FIG. 9 in the actuation state.

FIG. 1 shows an elastic valve 20 in cross-section that is used in a pump head in accordance with the invention (not shown in FIG. 1). The elastic valve 20 here has a head 21*a* and an elastic wall 21*b*. The elastic wall 21*b* is here in step shape and has horizontal and vertical regions that form the steps. A predetermined kink point 24 is formed here where a vertical and horizontal section of the elastic wall 21*b* converge. The thickness of the vertical wall (reference symbol V) is here dimensioned larger than the thickness of the horizontal wall (reference symbol H). The head of the wall has an outer surface 22 to which four concentrically arranged sealing lips L are attached in the exemplary case of the valve 20 in accordance with FIG. 1. The sealing lips L here project out of the surface 22 of the head 21*a* of the elastic valve 20. The surface 22 can equally have a valve head element 25 that can engage into the discharge opening 11 of the head base (not shown in FIG. 1). The element serves to reduce the residual volume in the outlet region. In the closed state, the outlet opening is thus closed by the elastic valve 20 in that the inner space of the pump head is terminated with respect to the environment by pressing the sealing lips L onto the wall 12 of the head base 10. The head 21*a* of the valve 20 can be solid here and the elastic wall 21*b* can be joined to the head 21*a* as a tubular wall. The completely elastic valve 20 can be manufactured in one piece in an injection molding process. Fixing elements 23, for example a peripheral spring, are present at the elastic wall 21*b*. The function and the use of the elastic valve shown in FIG. 1 are explained in more detail in FIGS. 2 and 3 respectively.

FIG. 2*a* shows different perspective representations of an elastic valve 20 that substantially corresponds to the embodiment in accordance with FIG. 1. FIG. 2, perspective a) shows—as also already in FIG. 1—a section through the elastic valve. The elastic valve is here identical to the valve shown in FIG. 1. Perspective representation b) shows a plan view of the valve 20 from above. In the selected representation, there is a view of the wall 21*a* and of the elastic wall 21*b*. It can be seen that the four lips L are arranged concentrically around the valve head element 25 and are formed in the region of the head 21*a*. Perspective representation c) is to this extent identical to the embodiment shown in perspective representation a), but the valve 20 is shown in the operating state in perspective representation c). It can be recognized that a dipping of the head part 21*a* takes place via a deformation of the elastic wall 21*b*, in particular at the predetermined kink point 24. The deformation is illustrated by the two horizontal lines that represent the vertical position of the valve head element 25.

FIG. 2*b* shows an enlarged detail of the valve 20 and the cooperation of the elastic valve 20 together with the lips L with the inner surface 12 of the head base 10. The first two lips L1 and L2 of the valve 20 are shown. In the exemplary case, the first lip L1 is configured such that the angle of incidence θ includes an acute angle, e.g. 10°-45°, with the inner surface 12 of the component 10. It is thus ensured that the sealing lips L always nestle correctly at the inner surface 12 of the head base 10. The contact surface of the lip at the wall 12 of the head base is increased by the partial deformation on the pressing on so that the sealing effect is increased.

FIG. 2*c* shows such an assembly by way of example. The interaction of the head base 10 with the elastic valve 20 is shown. The valve is shown in the closed state on the left side of FIG. 2*c* (to the left of the vertical line). The lips L are here pressed onto the inner wall 12 of the head base 10. Due to the geometry of the lips shown in FIG. 2*b*, a curvature of the elastic lips L takes place here so that a secure closure is ensured.

The hypothetical design of the lips is shown to the right of the vertical line. The certain play can be recognized that contributes to the deformation of the lips, as shown on the left.

FIG. 3 shows an explosion drawing of a pump head I that is in particular suitable as a metering head for a squeeze bottle. The pump head I here comprises a head base 10 having an outlet opening 11 that can preferably be configured for a drop-like dispensing of fluids. It is, however, equally possible to configure the outlet opening such that an atomized spray can be generated on the dispensing of the fluid. The head base 10 is here seated directly on a component 40 and is connected thereto in a positively-locking and force-fitting manner. The head base 10 here has an internal recess that has an inner surface 12. An elastic valve 20 that is described in FIG. 1 and that has a head 21*a* and an elastic wall 21*b* is arranged between the head base 10 and the component 40. The elastic valve 20 is fixed to the component 40 via the fixing elements 23. For this purpose, the fixing elements 23 are latched into corresponding fixing elements 43, for example a peripheral groove, of the component 40. The component 40 has a wall 42 that constructionally separates the pump head I into an upper part (the part that comprises the head base 10 and the elastic valve 20) and a lower part (below the wall 42). A component 60 that is connectable to the component 40 in a positively-locking manner is inserted below the wall 42 of the component 40. An intermediate space 40-60 results between the component 60 and the component 40. The component 40 here has a passage opening 41 that is configured in the case shown by way of example in FIG. 1 such that the passage opening 41 is led through the wall 44 of the component 40 in the lower part of the component 40 (at the level of the intermediate space 40-60) and is there led around the component 40 in a notch (not shown) or groove on the outer surface of the component 40. The notch here communicates with a channel that is not shown in FIG. 3, that leads upward, and through which the fluid can be conducted in the direction of the valve 20 or of the head base 10. The channel guided on the surface of the component 40 is here bounded and terminated by the placed-on head base 10.

The component 60 adapted for connection to a storage flask II has a passage channel 61 for fluid to be dispensed. The component 60 is here inserted so far into the component 40 that the wall 62 in not directly terminated by the wall 42 of the component 40, but rather a remaining intermediate region 40-60 is maintained (see also FIG. 4 in this respect). In the exemplary case of the pump head I in accordance with FIG. 3, a material 50 is attached between the component 40 and the component 60 that filters bacteria and via which an exchange of air of the inwardly disposed region of the pump head with the environment is possible. The bacterial filter 50 here has a passage channel 51 that is arranged flush with the passage opening 41 of the component 40. A fluid to be dispensed can thus flow through the passage channel 61 of the component 60, further through the passage channel 51 of the bacterial filter 50 (that extends horizontally in the upper region of the bacterial filter), and further through the passage opening 41 of the component 40 and can be supplied via the notch (not shown) on the outer surface of the component 40 to the upwardly leading channel (not shown). In addition, the pump head can have a sealing element (not shown) via which a sealing attachment of the pump head I to a storage vessel II, not shown in FIG. 3, is possible.

FIG. 4 shows a pump head I in accordance with FIG. 3 that is shown on a storage vessel II, on a squeeze bottle in the case of FIG. 4. The same reference numerals are used here as shown in FIG. 3. The squeeze bottle II is here not fully shown. It equally comprises an elastic material and can be actuated by pressure on the side walls. The metering device is here held upside down for metering so that the fluid can enter into the passage channel 61. The fluid is pressed into the pump head I on pressure onto the squeeze bottle II. In FIG. 4, the path of the fluid out of the storage container II in the direction of the outlet opening 11 that results through the passage channel 61 of the component 60, through the intermediate region 40-60 between the component 60 and the component 40, through the passage opening 41, through the intermediate space 10-20 that results on an actuation of the metering apparatus in accordance with FIG. 4, and finally in the direction of the outlet opening 11 is indicated by an arrow X. The intermediate space 10-20 is formed in that the fluid to be dispensed is pressed between the contact point of the sealing lips L and the inwardly disposed wall 12 of the head base 10 by the actuation pressure on the squeeze bottle II while deforming the elastic valve 20. The gap forming due to the deformation of the valve 20 is sufficient for the sealing lips to release a flow passage in the direction of the outlet opening 11. It is equally ensured by the deformation of the elastic valve 20 that the discharge opening 11 is released so that the fluid to be dispensed can exit the outlet opening 11.

A design as an active pump head that enables a dispensing of a fluid while actuating the pump head (and not the squeeze bottle) and/or a design as a self-metering metering apparatus is equally possible. Reference is made in this respect to the international patent application WO 2018/010890 A1 and in particular to the embodiments shown in the Figures contained therein.

Corresponding active embodiments of a pump head in accordance with the invention will be presented in the following by way of example.

FIG. 5 shows a further embodiment of a pump head I in accordance with the invention that is configured as an active pump head and can thus be actuated. The reference numerals in accordance with FIG. 5 (also in the further Figures discussed below) are identical here, as in FIGS. 3 and 4, and designate identical components. The definitions of the reference numerals will not be repeated again in connection with FIG. 5 and the following Figures; what has already been said on FIGS. 3 and 4 here applies without restriction, also to the Figures described in the following.

The pump head I is here designed identically to the pump head in accordance with FIG. 3 as regards the head base 10 and the first component 40. An elastic valve 20 as shown in FIG. 2 (that is comprising four concentric lips L) is introduced between the head base 10 and the component 40. A further elastic valve 201 is additionally introduced between the first component 40 and the second component 60. The second component 60 additionally comprises a projection 62 by means of which the pump head can be actuated, i.e. can be pressed downwardly by a user, for example. A further elastic valve 201 that will be described in more detail in the following is moreover introduced into the second component 60. The valve 201 here has a guide element 204, a pin in the exemplary case of FIG. 5, that can engage into a corresponding guide element 47 of the first component 40, a corresponding cutout in the exemplary case of FIG. 5. The elastic valve 201 here releases the passage channel 61 of the second component 60 in the actuation state of the pump head I.

In the case of the pump head I in accordance with FIG. 5, the second component 60 has a projection 62 by means of which the pump head can be actuated.

The pump head I in accordance with FIG. 5 moreover comprises a cylindrical pump body 80 that can engage into the second component 60 from below. A spring 63 is moreover formed between the second component 60 and the cylindrical pump body 80, which spring can release the second component 60 and the cylindrical pump body 80 from one another again after actuating the pump head I and can thus move the pump head I back into the storage state.

The cylindrical pump head has a central leadthrough opening into which a piston 100 having a corresponding continuous channel 101 can be introduced. The continuous channel is here arranged flush with the passage channel 61 of the component 60. The piston 100 can be received by a reception opening or recess 64 of the second component 60.

The cylindrical pump head 80 has an upper pump body section 81 and a lower pump body section 82 that are both formed as hollow cylindrical and divide the cylindrical pump body into two.

The piston 100 is here movably supported in a pump body 90 and can become smaller by the displacement of the volume of the reception opening of the pump body and thus press liquid through the continuous channel in the direction of the outlet opening 11. The pump body 90 furthermore has a valve 95 at the base side that can close the inlet opening in the metering process. In addition, a seal (not shown) can be introduced between the pump head I and the storage vessel II for the sealing connection of the pump head I to the storage vessel II (not shown in FIG. 5).

FIG. 6 shows different perspective views of the second elastic valve 201 that is introduced between the first component 40 and the second component 60 in the pump head in accordance with FIG. 5. Perspective a) shows a lateral projection of the valve 201. The valve here comprises a base body 202 that is configured such that the passage opening 61 of the second component 60 is closed by contact in a closure state. The guide element 204 is equally shown that ensures a secure movement of the second valve in the direction of the first component 40 in the actuation state. The representation shown in perspective b) shows a plan view of the valve 201 from above. Two circular segment-like recesses 203 can be seen that make it possible on the release of the passage opening 61 of the second component 60 by the valve 201 that fluid to be dispensed flows around the base body 202 of the valve 201 and can thus be guided in the direction of the first component 40. Perspective c) shows a further lateral projection of the valve 201 starting from the representation from perspective b). Perspective d) sows the deformation of the valve 201 during an actuation procedure. The representation shown in perspective d) represents a section through the valve 201. The deformation of the elastic valve 201 in the actuation state can be seen. An upward deformation of the valve takes place (and due to the fixing of the valve 201 by the first component 40), whereby the passage opening 61 of the second component 60 is released. The deformation of the valve is shown by the two horizontal lines that represent the lower end of the valve 201 and the two arrows.

FIG. 7 shows the pump head in accordance with FIG. 5 in the assembled state. The pump head I is additionally attached to a storage vessel II that has a folding bellows 105 in which fluid to be dispensed is introduced in its interior. Reference is made to the embodiment in accordance with FIG. 5 with respect to the significance of the reference numerals that are identical to this extent. FIG. 7 shows the pump head I in a storage state.

FIG. 8 shows the pump head in accordance with FIG. 7 in the actuation state. The actuation state is achieved in that a user presses onto the projection 62 and thus presses the second component including the piston 100 downwardly. The movement process is represented by the two arrows. The spring assembly 63 is compressed in this process. Due to the volume reduction by insertion of the piston 100 into the pump body 90, fluid located in the pump body 90 is upwardly dispensed along the line shown in FIG. 8 through the continuous channel 101 of the piston 100 and through the passage opening 61 of the second component 62 and in so doing deforms the elastic valve 201 that is attached in the intermediate space 40-60 between the first component 40 and the second component 60. The passage channel 41 in the first component 40 is thereby released. Fluid hereby flows into the intermediate space 10-20 between the head base 10 and the elastic valve 20 that further releases the discharge opening 11 in the manner already shown in connection with FIGS. 3 and 4 so that the fluid is ultimately released to the environment.

FIG. 9 shows a further embodiment of a pump head in accordance with the invention that is configured for lateral output. The actuation of the pump head here takes place by pressure onto the first component 40. Identical reference numerals as in the preceding Figures were used here. The pump head in accordance with FIG. 9 here also comprises an elastic valve 20 as shown in FIG. 1 or FIG. 2. The pump head I in accordance with FIG. 9 additionally comprises a second elastic valve 201. The function here is identical to the pump head I as described in FIGS. 7-9; only the path of the fluid guidance through the pump head I is designed differently here.

FIG. 10 describes the actuation state of the pump head in accordance with FIG. 9; the pressure point is described by the above-indicated large arrow; the discharge of fluid through the discharge opening 11 by the small arrow.

The invention claimed is:

1. A pump head for a metering device for a metered dispensing of a fluid comprising:

a head part having a discharge opening for the fluid to be dispensed, wherein the head part has an inner surface;

an elastic valve that has a surface facing the inner surface of the head part, wherein the elastic valve includes at least two sealing lips, wherein the at least two sealing lips are formed peripherally around each other, wherein at least one sealing lip of the at least two sealing lips is formed peripherally around the discharge opening, and wherein the at least two sealing lips are formed on and protrude from the surface of the elastic valve; and a first component that has a passage opening for the fluid to be dispensed via, a flowing in of the fluid between the head part and the elastic valve while deforming at least one of, the elastic valve or the at least one sealing lip, and wherein an intermediate space is formed between the at least one sealing lip and the head part during an actuation state, wherein the head part and the first component are connected positively-locking and in a force-fitting manner while enclosing the elastic valve between the head part and the first component.

2. The pump head in accordance with claim 1, wherein the elastic valve comprises:

a head; and an elastic wall.

3. The pump head in accordance with claim 2, wherein the elastic wall has at least one predetermined kink point at which the elastic wall kinks at least one of: downward or inward on a movement from a storage state into the actuation state.

4. The pump head in accordance with claim 3, wherein the elastic wall is designed in a step shape and has at least one vertical region and at least one horizontal region.

5. The pump head in accordance with claim 4, wherein the at least one predetermined kink point is formed at a connection point of the at least one vertical region and the at least one horizontal region.

6. The pump head in accordance with claim 4, wherein at least one of: the elastic wall is formed from an elastically deformable material, or the head is formed as solid, and wherein the at least one horizontal region is thinner than the at least one vertical region.

7. The pump head in accordance with claim 4, wherein the at least one horizontal region is thinner than the at least one vertical region, wherein at least one of: the at least one vertical region has a thickness of between 0.01 mm and 2.0 mm, inclusive, or the at least one horizontal region has a thickness of between 0.01 mm and to 1.0 mm, inclusive.

8. The pump head in accordance with claim 2, wherein at least one of the elastic wall or the head is formed from at least one of: a thermoplastic, polyethylene, polypropylene, rubber, or silicone.

9. The pump head in accordance with claim 2, wherein the elastic wall has a thickness of between 0.01 mm and 2.0 mm, inclusive.

10. The pump head in accordance with claim 2, wherein the head and the elastic wall are formed in one piece and are simultaneously manufactured by an injection molding process.

11. The pump head in accordance with claim 1, wherein the at least one sealing lip projects from 0.01 mm to 2 mm, inclusive, out of the surface.

12. The pump head in accordance with claim 1, wherein a circumference of the at least one sealing lip around the discharge opening is circular.

13. The pump head in accordance with claim 1, wherein the elastic valve is fluidically sealingly connected to the first component.

14. The pump head in accordance with claim 1, wherein the elastic valve has at least one fixing element via which the elastic valve is connected in a force-fitting manner to at least one corresponding fixing element of the first component, with the at least one fixing element of the elastic valve and the at least one corresponding fixing element of the first component are connected as at least one of: as a latch connection or as a snap connection.

15. The pump head in accordance with claim 1, wherein the first component has a wall that terminates the intermediate space, with and wherein a fluidic communication of the intermediate space with a region disposed at an other side of the wall as viewed from the intermediate space is made possible via the passage opening.

16. The pump head in accordance with claim 15, wherein the passage opening is led in the region through a lateral wall of the first component, is guided in a notch bounded by the first component, and at an outer surface of the first component, the passage opening is again led through the lateral wall of the first component in the region and opens into the region.

17. The pump head in accordance with claim 16, wherein the notch at the outer surface of the first component is guided at least one of horizontally or vertically.

18. The pump head in accordance with claim 16, wherein an angle the passage opening forms with a point where the passage opening is again led through the lateral wall of the first component and a center of the first component is between 1° and 350°, inclusive.

19. The pump head in accordance with claim 1, wherein an element that effects a return force on the elastic valve is arranged between the elastic valve and the first component, with the return force having an effect that the intermediate space formed in the actuation state is sealed while returning to a storage state, and wherein the element is a spring.

20. The pump head in accordance with claim 1, wherein the first component is connected at its end remote from the elastic valve to a second component, which has a passage channel, via which the pump head is directly or indirectly connectable to a storage vessel for storing the fluid to be dispensed.

21. The pump head in accordance with claim 20, wherein at least one of:

at least one bacterial filter for sterile filtration of incoming air, in is located between the first component and the second component; or the first component is configured to be hermetically sealing with respect to the second component.

22. The pump head in accordance with claim 21, wherein the at least one bacterial filter has at least one passage channel for the fluid, with the at least one bacterial filter being arranged in the pump head such that the passage channel opens into the passage opening.

23. The pump head in accordance with claim 22, wherein at least one of the first component is fixed with respect to the second component or the first component is configured to be movable, with at least one force element located between the first component and the second component that exerts a return force on the first component, wherein the at least one force element is a spring.

24. The pump head in accordance with claim 20, wherein on a direct connection of the pump head via the second component to a storage vessel, a seal is arranged between the second component and the storage vessel.

25. The pump head in accordance with claim 20, wherein a second elastic valve configured to close the passage channel of the first component in a storage state and that releases the passage channel by deformation in an operating state is located between the first component and the second component.

26. The pump head in accordance with claim 25, wherein the second elastic valve in projection onto the passage channel includes a base body closing the passage channel and includes at least one passage opening located outside the passage channel in projection onto the passage channel.

27. The pump head in accordance with claim 26, wherein the base body includes at least one of: a guide element or a stopper at a side facing the first component, that restricts deformation of the second elastic valve and cooperates with a corresponding guide element of the first component on a release of the passage channel, and wherein the stopper is a pin.

28. The pump head in accordance with claim 26, wherein the second elastic valve in projection onto the passage channel includes a base body closing the passage channel and includes at least two passage openings located outside the passage channel in projection onto the passage channel, wherein the at least two passage openings are arranged oppositely disposed, and wherein the at least two passage openings are formed as circle segment-like cutouts in the base body.

29. The pump head in accordance with claim 20, wherein the second component comprises an actuation means, wherein the actuation means is a projection.

30. The pump head in accordance with claim 20, wherein the second component is indirectly connectable to a storage vessel, and with the pump head additionally comprising:

a cylindrical pump body that comprises a first hollow cylindrical pump body section that is open in a direction of the storage vessel and a second hollow cylindrical pump body section that is open in a direction of the second component;

an inner hollow cylinder that is open at a first end and a second end, wherein the inner hollow cylinder is configured to be fastened to the first hollow cylindrical pump body section, and wherein the inner hollow cylinder is arranged concentrically to the first hollow cylindrical pump body section; and a piston that has a continuous channel, that is movably supported concentrically in the cylindrical pump body and in the inner hollow cylinder, and that is configured as sealing with an inner wall of the inner hollow cylinder, wherein the second component is configured to be connected to the cylindrical pump body and is movably supported with respect to the cylindrical pump body, and wherein the continuous channel opens into the passage channel.

31. The pump head in accordance with claim 30, wherein the second component has a recess for receiving an upper end of the piston.

32. The pump head in accordance with claim 30, wherein a spring element, is arranged between the second component and the cylindrical pump body, and wherein the spring element exerts a return force on the second component at least one of: during or after an actuation.

33. The pump head in accordance with claim 30, wherein the first hollow cylindrical pump body section has an apparatus for fastening the pump head to the storage vessel.

34. The pump head in accordance with claim 30, wherein a seal is configured to be arranged in a region of the first hollow cylindrical pump body section, and is configured to seal the storage vessel with respect to the pump head.

35. The pump head in accordance with claim 30, wherein a riser pipe is located at whichever of the first end or the second end of the inner hollow cylinder is open in the direction of the storage vessel.

36. The pump head in accordance with claim 30, wherein a sealing element for sealing the piston is configured to be between an outer side of the piston and an inner side of the second hollow cylindrical pump body section at an interior of the second hollow cylindrical pump body section.

37. The pump head in accordance with claim 1, wherein the head part comprises an antibacterial material, wherein the antibacterial material includes at least one of: silver particles or silver ions.

38. The pump head in accordance with claim 1, wherein the elastic valve has a first sealing lip located closer to the discharge opening than any other sealing lip, wherein the first sealing lip forms an angle (θ) with the inner surface of $1° \leq \theta \leq 85°$.

39. A metering device comprising:

a pump head connected to a storage vessel, the pump head comprising:

a head part, the head part including a discharge opening for fluid to be dispensed, wherein the head part includes an inner surface;

an elastic valve, the elastic valve including a surface that faces the inner surface of the head part, wherein the elastic valve includes at least two sealing lips, wherein the at least two sealing lips are formed peripherally around each other, wherein at least one sealing lip of the at least two sealing lips is formed peripherally around the discharge opening, and wherein the at least two sealing lips are formed on and protrude from the surface of the elastic valve; and a first component, the first component including a passage opening for the fluid to be dispensed through, wherein a flowing in of the fluid between the head part and the elastic valve is made possible while deforming at least one of the elastic valve or the at least one scaling lip, and wherein an intermediate space is formed between the at least one sealing lip and the head part during an actuation state, wherein the head part and the first component are connected positively-locking and in a force-fitting manner while enclosing the elastic valve between the head part and the first component.

40. The metering device in accordance with claim 39, wherein the storage vessel is configured as at least one of: a squeeze bottle or as a rigid container.

41. The metering device in accordance with claim 39, wherein the storage vessel comprises;

an inner bag that is hermetically sealed with respect to the pump head, wherein the inner bag is configured as a folding bellows.

42. The metering device in accordance with claim 39, wherein the metering device is an airless system.

43. The metering device in accordance with claim 39, wherein the metering device is a drip or a spray system.

44. A pump head for a metering device for a metered dispensing of fluid, the pump head comprising:

a head part, the head part including a discharge opening for fluid to be dispensed, wherein the head part includes an inner surface;

an elastic valve, the elastic valve, the elastic valve comprising:

a surface that faces the inner surface of the head part; and at least two sealing lips, wherein the at least two sealing lips are formed on the surface peripherally around each other, wherein at least one sealing lip of the at least two sealing lips is located peripherally around the discharge opening of the head part, and wherein the at least two sealing lips protrude from the surface;

a head;

an elastic wall; and a first component, the first component including a passage opening for the fluid to be dispensed through a flowing in of the fluid between the head part and the elastic valve is made possible while deforming at least one of the elastic valve or the at least one sealing lip, and wherein an intermediate space is formed between the at least one sealing lip and the head part during an actuation state, wherein the head part and the first component are connected positively-locking and in a force-fitting manner while enclosing the elastic valve between the head part and the first component.

45. The pump head according to claim 44, wherein the elastic wall includes at least one predetermined kink point at which the elastic wall kinks at least one of: downward or inward on a movement from a storage state to the actuation state, wherein the elastic wall is designed in a step shape and has at least one vertical region and at least one horizontal region, wherein the at least one predetermined kink point is formed at a connection point of the at least one vertical region and the at least one horizontal region, and wherein at least one of the elastic wall is formed from an elastically deformable material or the head is formed as a solid.

* * * * *